US005578889A

United States Patent [19]
Epstein

[11] Patent Number: 5,578,889
[45] Date of Patent: Nov. 26, 1996

[54] PIEZOELECTRIC GENERATION OF ELECTRICAL POWER FROM SURFACE WAVES ON BODIES OF WATER USING SUSPENDED WEIGHTED MEMBERS

[75] Inventor: Michael Y. Epstein, Belle Mead, N.J.

[73] Assignee: Ocean Power Technologies, Inc., West Trenton, N.J.

[21] Appl. No.: 388,558

[22] Filed: Feb. 14, 1995

[51] Int. Cl.⁶ .................................................. H01L 41/08
[52] U.S. Cl. ............................ 310/339; 310/329; 290/53; 60/497
[58] Field of Search ...................... 310/328, 329, 310/338, 339, 800, 367; 290/42, 53; 60/495, 497

[56] References Cited

U.S. PATENT DOCUMENTS

| | | | |
|---|---|---|---|
| 3,760,402 | 9/1973 | Magerle et al. | 310/339 X |
| 4,048,526 | 9/1977 | Taylor | 310/329 |
| 4,051,395 | 9/1977 | Taylor | 310/800 X |
| 4,051,397 | 9/1977 | Taylor | 310/800 X |
| 4,110,630 | 8/1978 | Hendel | 290/53 |
| 4,317,047 | 2/1982 | de Almada | 290/53 |
| 4,404,490 | 9/1983 | Taylor et al. | 310/339 |
| 4,685,296 | 8/1987 | Burns | 60/497 |
| 4,742,241 | 5/1988 | Melvin | 290/53 |

*Primary Examiner*—Mark O. Budd
*Attorney, Agent, or Firm*—Michael Y. Epstein

[57] ABSTRACT

A system for converting the mechanical energy of ocean waves to electrical energy comprises a weighted member supported from a piezoelectric element for applying a preselected strain to the element. In one embodiment, the element is supported by a float floating on the surface of the water. In another embodiment, the element is supported above the surface of the water and the weighted member, of negative buoyancy, is immersed in the water. The system functions, in use, as an oscillating, weighted spring and, for tuning the system to cause it to enter into mechanical resonance in response to passing waves, means are provided for tuning the natural frequency of the oscillating system.

4 Claims, 4 Drawing Sheets

5,578,889

PIEZOELECTRIC GENERATION OF ELECTRICAL POWER FROM SURFACE WAVES ON BODIES OF WATER USING SUSPENDED WEIGHTED MEMBERS

BACKGROUND OF THE INVENTION

This invention relates to the generation of electrical energy by piezoelectric elements in response to surface waves on a body of water, and particularly to electrical power generating systems comprising a float on the surface of the water and piezoelectric elements suspended from the float.

Electrical power generating systems of the type with which the present invention has utility are shown in U.S. Pat. No. 4,685,296 issued to J. R. Burns. As disclosed in the patent, the subject matter of which is incorporated herein by reference, piezoelectric elements are suspended from a float on a surface of a body of water, particularly an ocean, and the lower ends of the piezoelectric elements are firmly anchored to the ocean floor. The vertical dimensions of the system are established such that at mean water level the piezoelectric elements are stretched a preselected amount, but within the elastic limits of the elements.

As the float moves vertically up and down in response to passing surface waves, the piezoelectric elements are alternately further stretched and relaxed, i.e., alternately strained and destrained. The piezoelectric elements generate electricity in direct proportion to the amount of variable straining of the elements.

Systems of the type disclosed in the patent present many practical problems including difficulties connected with anchoring the system and providing proper tension under changing water depth conditions, tuning the system under changing surface wave conditions, and protecting the system under severe storm conditions. The present invention provides a solution to all these problems.

SUMMARY OF THE INVENTION

According to one aspect of the invention, an electrical power generating system comprises a float for floating on a surface of a body of water, a resilient piezoelectric element supported by the float, and a weighted member suspended from the piezoelectric element for providing a pre-set strain therein. The weighted member is not fixedly anchored to the water body floor and is free to move vertically with respect to the floor. In use, the system oscillates as a stretched spring in response to surface waves, such oscillations causing alternating straining and destraining of the piezoelectric element for causing it to generate electrical energy. Preferably, the system oscillates in resonance with the surface waves, and means are provided for changing the natural frequency of the system in accordance with changing surface wave conditions for maintaining resonance operation.

The system floats freely on the water. For limiting drifting of the system, anchoring means are used, e.g., an anchoring cable secured directly to the system or through an intermediate floatation means.

In accordance with a second aspect of the invention, for use with a free standing platform, no float is used, and the upper end of the piezoelectric element is suspended above the water surface from a mounting means secured to the platform. The weighted member is suspended from the piezoelectric element and rests, preferably only partially submerged, on the water surface. Although of negative buoyancy, for pre-straining the piezoelectric element, the weighted member still moves vertically in response to passing surface waves for driving the system into oscillation.

In accordance with one method of operation of the inventive systems, during excessive storm conditions, portions of the system normally disposed on the water surface are submerged sufficiently to be protected from damage while still being exposed to surface wave influence. The pre-set strain in the piezoelectric element is maintained, whereby, even though partially submerged, power generation by the system continues.

DESCRIPTION OF THE DRAWING

All the figures are schematic and not drawn to scale.

DESCRIPTION OF PREFERRED EMBODIMENTS OF THE INVENTION

Figure 1:
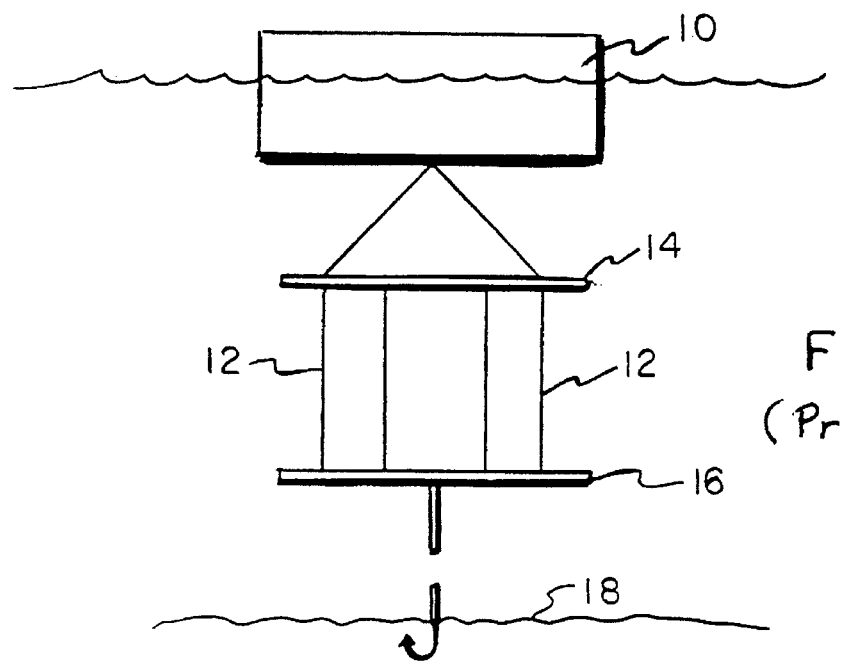
FIG. 1 is a side elevation of a prior art power generating system.

FIG. 1 shows a power generating system of the type shown in the afore-cited U.S. Pat. No. 4,685,296. The system comprises a float 10 suspending an array of piezoelectric elements 12 mounted between a pair of plates 14 and 16 with the bottom plate 16 firmly anchored to the ocean floor 18. The vertical dimensions of the entire system are selected to provide a preselected tensioning or straining of the piezoelectric elements when the water surface is perfectly flat. Accordingly, as the float 10 moves upwardly and downwardly in response to passing surface waves, the piezoelectric elements are alternately strained and destrained for generating electrical energy.

Figure 2:
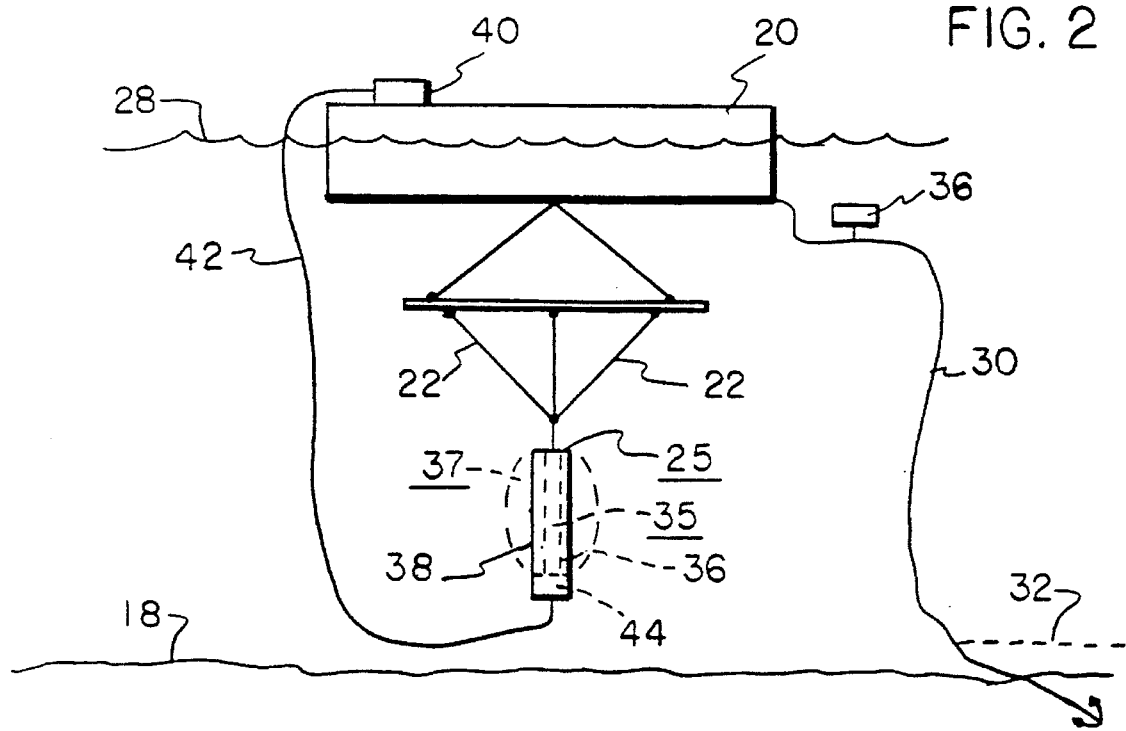
FIG. 2 is a side elevation of a system according to the present invention.

FIG. 2 shows basic components of a power generating system in accordance with one aspect of this invention. The inventive system comprises a float 20 from which are suspended a plurality of resilient piezoelectric elements 22 described further hereinafter. Suspended from the lower ends of the elements 22 is a weighted member 25 having sufficient weight to provide a pre-selected straining of the elements 22-at mean water level. By "mean water level" is meant the height of the water surface 28 in the absence of waves.

In comparison with the prior art system shown in FIG. 1, the weighted member 25 is entirely different from the prior art lower plate 16 which serves merely as a means for connecting to the lower ends of the piezoelectric elements 12. Tensioning in the prior art system is provided by vertical anchoring of the plate 16 to the ocean floor. Conversely, in the inventive system, tensioning is provided by the weighted member 25 itself which is independent of the ocean floor with respect to vertical movements of the member 25.

It is, of course, necessary to limit lateral drifting of the inventive system, and to this end, a restraining cable 30 connected to the float 20 is shown in FIG. 2. Alternatively, the cable can be connected to the weighted member 25. Conveniently, the cable 30 can be part of a power cable (indicated by dash lines 32) used for transmitting electrical energy generated by the system to an on-shore collecting station. Of significance, as will be evident to persons skilled in the marine arts, the anchoring requirements of the inventive system are small in comparison with the anchoring requirements of the FIG. 1 system. In the latter, the anchors must withstand vertical forces which requires a massive anchoring system. In the inventive system, only lateral forces due to ocean currents and winds must be resisted. By providing a large loop (referred to in the maritime art as "scope") in the cable 30, the cable is practically horizontal along the ocean floor and provides substantially only horizontal forces. As such, a quite simple and conventional type anchor can be used which is significantly less massive, complicated and expensive than the anchoring means necessary in the FIG. 1 system.

For a reason described hereinafter, depending upon the size and weight of the system and the weight of the restraining cable (which is a function of the water depth), it may be desirable to suspend the cable 30 from floatation means 36 for reducing the drag of the cable on the member to which it is attached. Alternative drift restraining means are described hereinafter.

Figure 4:
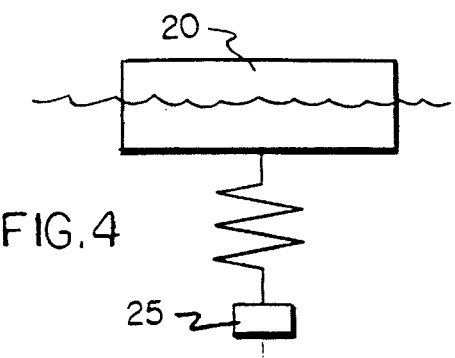
FIG. 4 shows a coil spring structure mechanically equivalent to the structure shown in FIG. 2.

In use of the inventive system, as the surface float 20 moves vertically in response to passing waves, the entire system responds as a disturbed weighted coil spring as schematically illustrated in FIG. 4. Thus, the system oscillates in response to the passing waves thereby alternately straining and destraining the piezoelectric elements.

For proper functioning, spring-like characteristics must be present and, as previously noted, "resilient" piezoelectric elements are used. In actuality, the required resiliency can be no more than that inherently possessed by the piezoelectric elements for allowing alternating straining and destraining thereof in response to the alternating stresses applied thereto. Still, as described hereinafter, additional resiliency can be provided to the system as may be required.

As described, the system functions as an oscillating, weighted spring. The mathematics of such systems are known and can be found in standard reference works. One problem is that the mathematical analyses known to the applicant involve the assumption (presumably for simplifying the analysis) that the weight of the body 25 (FIG. 4) is significantly greater than that of the spring 22. In actual use, the entire weight of the system must be supported by a float 20, and, to the extent that the weight 25 in addition to that of the piezoelectric elements 22 is required, the size and the expense of the float are increased. Accordingly, while a weight 25 is shown in FIG. 2, as a practical matter it is made as small as possible in comparison with that of the piezoelectric elements. The system oscillates in response to the vertical displacements of the ends of the system relative to one another resulting from vertical movements of the float 20 in response to passing waves. At the worst, the oscillations are "forced" oscillations as determined solely by the wave frequency. Electrical energy is generated by the piezoelectric elements 22 in response to oscillations of any kind, hence the system has utility.

Maximum efficiency of energy conversion, that is, maximum absorption of energy by the system from the passing waves, occurs when the natural frequency of the system equals, or is an integer multiple of, that of the passing waves. The natural frequency of an oscillating coil depends essentially on two factors: 1) the mass of the system, and 2) its elasticity. Increasing mass lowers frequency and increasing elasticity (stiffness) increases frequency. Also, to a relatively small extent, the natural frequency is affected by the dampening provided by the surrounding water.

Designing a system such as that shown in FIG. 2 to have a natural frequency corresponding to a given set of surface waves, e.g., ocean waves occurring at 0.1 Hz, is feasible in view of the wide variety of piezoelectric materials available and possible variations in their form factors. For example, in the system shown in FIG. 2, three cable-like piezoelectric elements 22 are shown. The volume of piezoelectric material in the elements is a principal factor in the amount of energy generated by the system and, for a given system, is a pre-fixed amount. However, with the same volume, or weight of piezoelectric material, the configuration of the system is widely variable. Thus, by using six piezoelectric elements 22 in place of the three shown in FIG. 2, each of the replacement elements having half the length and weight of the replaced elements 22, hence the same total weight and volume, the stiffness of the system is approximately doubled. Other variations, e.g., cable diameter, are possible.

One problem is, that, while the system can be designed to have a preselected natural frequency, it is likely that, over time, different surface waves having different frequencies will be encountered, and to this end, means are herein provided for altering the natural frequency of the system for tuning it to changed wave conditions.

It is first noted that, even in the absence of tuning means, which would perhaps not be practical in relatively small systems, the system parameters can be established to provide resonance with the most common wave conditions anticipated, with a fall-off of conversion efficiency with changes from such conditions. The rate of fall-off of conversion efficiency is a function of the sharpness of tuning of the system, i.e., the so-called quality factor Q. In systems where variable tuning of the system is not practical, it may be desirable to design the system with broad or coarse tuning, whereby the system is reasonably well tuned over a relatively wide range of oscillation frequencies. A trade-off, of course, is that the amplitude of the system oscillations is a direct function of the sharpness of tuning of the system, which is why a finely tuned system is preferred. The sharpness of tuning is a function of the amount of dampening provided by the system environment. This can also be varied as hereinafter described.

One means for tuning the system comprises changing the weight of the weighted member 25. This can be done using known means for controlling flooding of the weighted member using pressurized air. Thus, as shown in FIG. 2, the upper float 20 is provided with an electrically driven air compressor 40 communicating, via a hose 42, to a storage air tank 44 in the weighted member. Means for controlling flooding of submersible craft are well known.

FIG. 2 also shows an arrangement whereby variable dampening can be obtained for varying the sharpness of tuning of the system. The surrounding water tends to dampen oscillations, and the degree of dampening is a function of the horizontal surface area of the weighted member 25. FIG. 2 shows a weighted member 25 comprising a central tank 35 having a rigid wall 36 for containing variable, selected amounts of water, and a peripheral tank 37 surrounding the central tank 35 and having a flexible external wall 38. Thus, by altering the air pressure within the peripheral tank 37, the shape of the weight 25 can be altered, as indicated by dot-dash lines in FIG. 2, for altering external dampening, hence the sharpness of tuning of the system.

Figure 3:
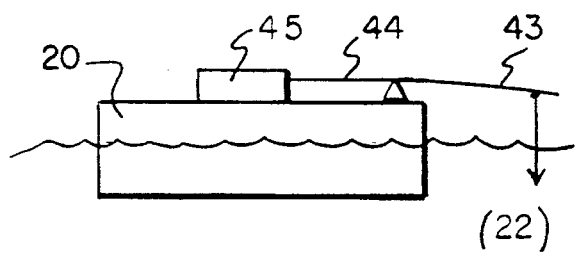
FIG. 3 is similar to FIG. 2 but shows only an upper portion of the FIG. 2 system for illustrating a modification thereof.

Tuning of the system can also be achieved by changing the elasticity thereof, that is, the spring constant K, which is the force required for a unit elongation of the spring. An example of this is illustrated in FIG. 3 which shows a cantilevered boom 43 extending horizontally from the float to which a piezoelectric element and weighted member (neither of which is shown) are suspended. The boom 43 is resilient, as indicated by the curvature therein shown, and the amount of resiliency of the entire system is influenced by the resiliency of the boom 43. This, however, is a function of its cantilevered length, and for varying such length, the boom 43 is connected to the piston 44 of a horizontally disposed cylinder 45. Reducing the cantilevered length of the boom 43 increases the stiffness of the system.

Figure 5:
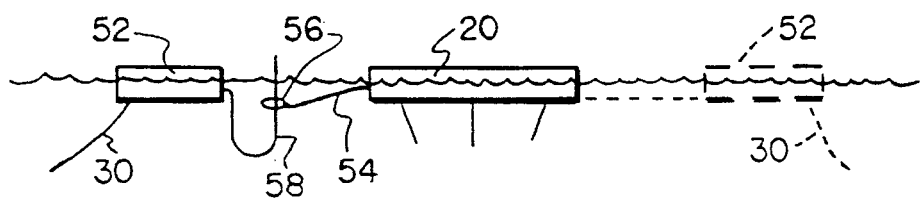
FIGS. 5 and 6 are partial views similar to FIG. 2 but showing floatation, drift preventing means for limiting drift of the system.

As previously noted, for minimizing the drag from an anchoring cable, floatation means 36 (FIG. 1) can be used to support the weight of the cable. An alternative arrangement is illustrated in FIG. 5.

In this arrangement, a second float 52 is provided to which the anchoring cable 30 (and/or power cable) is attached. The cable 30 prevents escape of the system while allowing "swinging" of the system around its anchorage, as is common with anchored vessels. The "first" float 20 is secured to the second float 52 by a relatively short cable 54 ending in an O-ring 56 loosely secured to a vertical coupling rod 58 on the second float 52. Accordingly, the first float 20, while restrained from lateral drifting, floats freely for vertical movements.

If the waves coming to the system arrive consistently from a single direction, two "second" floats 52 and anchoring cables 30 can be used (as indicated by dashed lines in FIG. 5) for retaining the generating system properly oriented with respect to the waves (e.g., not masked from the waves by one or both second floats 52).

Figure 6:
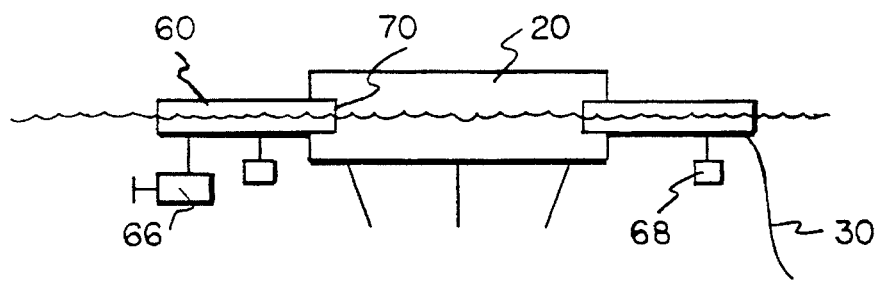
Figure 7:
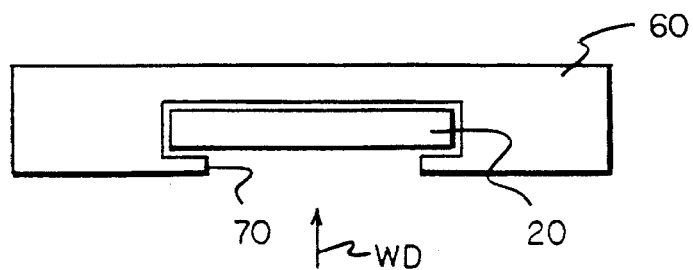
FIG. 7 is a plan view of the arrangement shown in FIG. 6.

If the waves arrive from different directions, another arrangement is as shown in FIGS. 6 and 7. Here, a single "second" float 60 is used having a generally C-shape for loosely enclosing the first float 20. The second float 60 is attached to an anchoring cable 30, preferably by a freely rotatable connector of known type whereby the float 60 can rotate relative to the cable axis without twisting the cable 30. Suitable means, such as rudders 68 and electrically driven propellers 66, are used for maintaining the opening 70 of the second float facing towards the advancing waves, the direction of which is indicated by the arrow WD in FIG. 7.

As shown in FIG. 7, the first float 20 has a generally elongated, rectangular shape, with the short axis maintained, by the second float 60, parallel to the direction of the advancing waves. The reason for this is to reduce so-called cancellation effects, described in the afore-cited U.S. Pat. No. 4,685,296, possibly resulting when the float 20 has a width in the direction of the waves comparable to the wavelength of the waves. Such cancellation effects arise when, rather than the float being uniformly raised and lowered by the waves, the float is tilted by the waves with the result that opposite sides of the float, in the direction of advance of the waves, are simultaneously raised and lowered. Such simultaneous raising and lowering of different portions of the float tends to simultaneously strain and destrain the piezoelectric elements thus tending to cancel the outputs of the elements. This problem is substantially avoided if the width of the float 20 is relatively small (see the afore-cited U.S. Pat. No. 4,685,296 and U.S. Pat. No. 4,404,490 issued to J. R. Burns and G. W. Taylor, the subject matter of which is also incorporated herein by reference).

Figure 8:
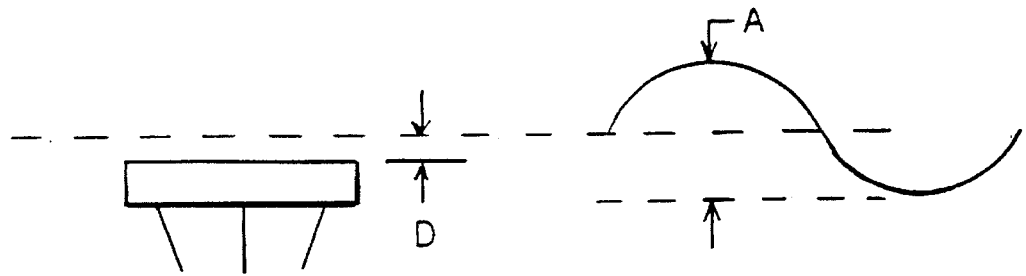
FIG. 8 is a view similar to FIG. 2 but showing the upper float partially submerged.

A further significant advantage of the herein-described free floating systems is that the entire system can be completely submerged for protecting the system against excessively violent storms, but not so deeply for discontinuing operation of the system. Thus, by flooding the upper float 20 (along with any "second" floats used in combination therewith) to cause its submergence, as shown in FIG. 8, to a depth D below the mean water level, but only to a depth necessary for safety reasons, the upper float 20 will remain within the area of activity of the surface waves. Accordingly, the float will still be alternately lifted and lowered, for continuing oscillations of the system, and power generating activity will continue, even if at a reduced scale. As shown in FIG. 8, the depth D is preferably slightly less than one-half the peak to peak amplitude A of the largest storm waves.

A certain degree of complexity is thus called for in the system; that is, means for regulating the submerged depth of the system (using known depth regulating means). But, in particularly large power generating systems, the ability to continue generating power under the worst possible storm conditions is worth the cost of the regulating means.

Another embodiment 72 of the invention is now described in connection with FIG. 9. This embodiment is used in connection with a free standing platform 74, e.g., a platform standing on the ocean floor 18 by means of legs 76. Ocean platforms of various types used for off-shore oil drilling are known.

In the embodiment 72, one or more piezoelectric elements 22, preferably in the form of cables, hereinafter described, are hung from the platform and support a weighted member 25 preferably only partially submerged in the water. The weighted member 25 has negative buoyancy, hence provides a downward force on the piezoelectric elements for appropriately pre-straining them. The weight of the weighted member 25 is partially supported by the volume of water displaced by the member. As surface waves pass the member tending to change the volume of displaced water, the water supported weight of the member varies, thereby changing the weight supported by the piezoelectric elements 22. Accordingly, the piezoelectric members are alternately strained and de-strained in response to the passing waves.

A significant advantage of this embodiment is that the piezoelectric elements 22 can be disposed completely out of the water, and the upper surface of the weighted member provides a work platform for performing maintenance, coupling and decoupling operations.

Figure 9:
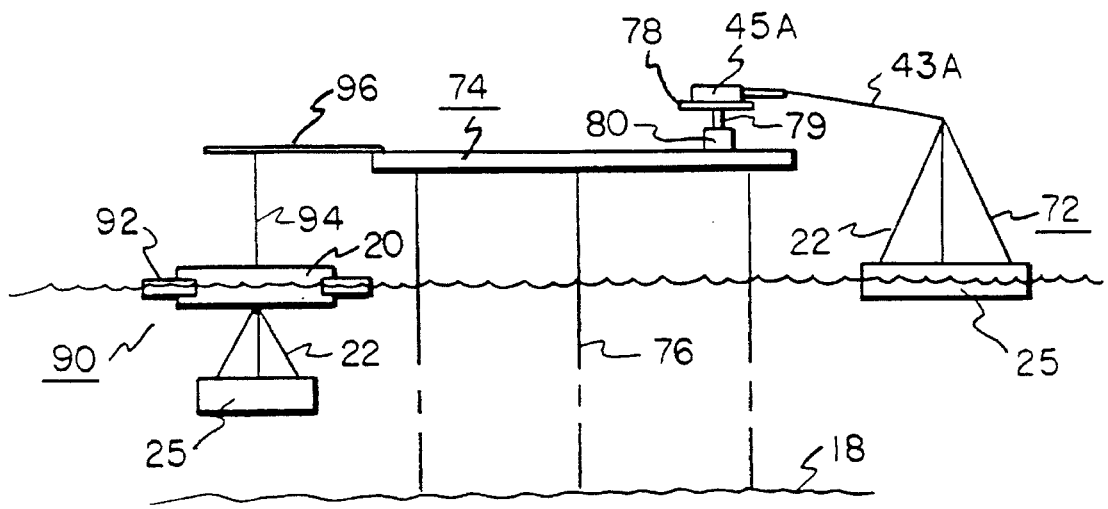
FIG. 9 shows two different power generating systems according to this invention used in connection with a free standing platform.

FIG. 9 shows the upper ends of the piezoelectric elements 22 of the embodiment 72 suspended from a cantilevered, resilient, metal boom 43A similar to the boom 43 shown in FIG. 3. An air cylinder 45A is provided for changing the cantilevered length of the boom 43A for changing the elasticity, hence the natural frequency of the system. In addition, the air cylinder 45A and boom 43A are mounted on a platform 78 mounted for vertical movements on the piston 79 of a vertically disposed air cylinder 80. By virtue of the vertical cylinder 80, the boom 43A can be moved vertically for changing the height of the upper ends of the piezoelectric elements above the ocean surface for tuning the system in response to changing wave conditions. Also, under storm conditions, by lowering the piezoelectric elements and the weighted member 25, the member 25 can be disposed beneath the ocean surface for protecting it against damage while the upper ends of the piezoelectric elements are still above the surface. Provided the pre-set strain of the piezoelectric elements is maintained, and provided the submerged weighted member 25 remains influenced by varying wave forces, generation of power by the system can be continued. Critical to such mode of operation, of course, is that the above-surface components of the system can withstand the storm conditions. However, with relatively stiff and small diameter cable-like piezoelectric elements (to be described) and a strong but small cross-sectional area boom 43A, the upper ends of the system (above the highest waves), offer relatively little wind resistance. Thus, quite severe storm conditions can be tolerated.

Figure 10:
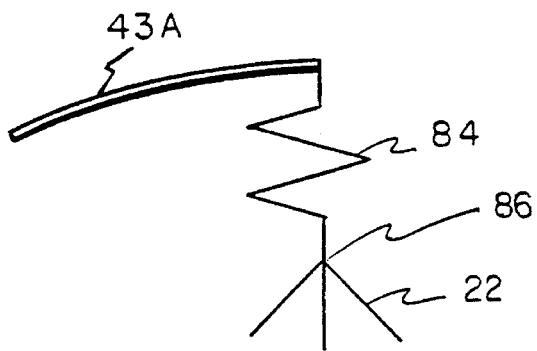
FIG. 10 shows a modification of one of the power generating systems shown in FIG. 9.

In the embodiment 72 illustrated in FIG. 9, the negative buoyancy weighted member 25 oscillates in conformity with the amplitudes of the passing waves, and the added resiliency provided by the boom 43A can be quite significant in the design of the system. Another means for adding resiliency is the disposition (FIG. 10) of a coiled spring 84 between the upper ends 86 of the piezoelectric elements 22 and the boom 43A. Alternatively, as described hereinafter, the piezoelectric elements are themselves in the form of coiled springs.

FIG. 9 also shows another embodiment 90 of the invention. This embodiment is basically a free floating system such as shown in FIGS. 6 and 7 which is tethered to the platform by a cable or the like. Preferably, however, for preventing entanglement of the system 90 with the supporting structure of the platform, a float 92 is used similar to the C-shaped float 60 shown in FIG. 7. In FIG. 9, the float 92 is being viewed along the wave direction WD shown in FIG. 7. Also, for changing the orientation of the float 92, for accommodating different direction waves (during different time periods), the float 92 is rotatably mounted by means of an axle 94 from a projecting, rigid support beam 96. Proper orientation of the float 92 relative to the direction of the advancing waves can be maintained similarly as in the embodiment illustrated in FIGS. 6 and 7.

Different piezoelectric materials and elements can be used, but a preferred material comprises a known PVDF polymer. PVDF stands for poly vinylidene fluoride. By "PVDF polymer" is meant either the PVDF polymer by itself or various copolymers comprising PVDF and other polymers, e.g., a copolymer referred to as P(VDF-TrFE) and comprising PVDF and PTrFE (polytrifluoroethylene).

Such PVDF polymers are known, commercially available materials having various commercial applications, e.g., as dielectric materials for capacitors and as electrical signal generators in transducers. For use in such applications, the PVDF polymers are typically provided in sheet-like form comprising (FIG. 11) a core layer 100 of the PVDF material having metal, e.g., tin, aluminum, etc., layers 102 on opposite surfaces thereof serving as electrodes.

Figure 11:
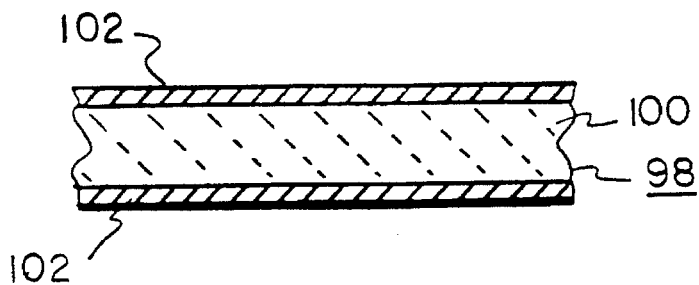
FIG. 11 shows, in cross-section, an example of a known sheet-like electroded piezoelectric element.

For use in the present invention, the various piezoelectric elements 22 disclosed herein can comprise individual sheets of the PVDF material suspended between supporting members, e.g., the float 20 and the weighted member 25 as shown in FIG. 2. Alternatively, several such sheets 98 such as shown in FIG. 11 can be laminated together to form elongated beam-like structures.

Figure 12:
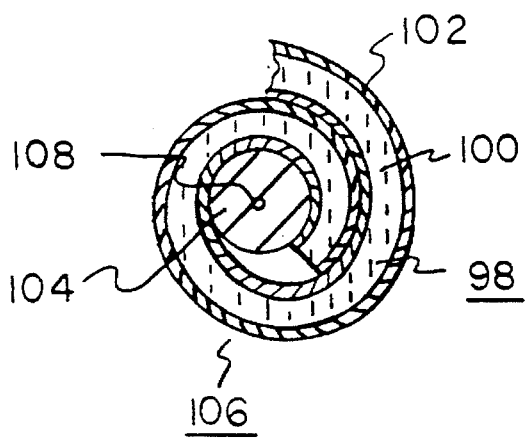
FIG. 12 shows, in cross-section, an example of a cable formed from the sheet-like piezoelectric element shown in FIG. 11.

Also, as shown in FIG. 12, an individual sheet 98 can be wound around a central mandrel 104 to form an elongated cable 106. Preferably, the mandrel 104 is also of a piezoelectric material, but of much greater stiffness than the PVDF material, e.g., of various known piezoelectric crystalline materials or piezoelectric ceramic materials. The mandrel 104 is surrounded by an electrode layer 102 from the surrounding sheet 98 and an inner electrode is provided in the form of a central rod or wire 108.

In all embodiments, the outer electrode layer or layers of the piezoelectric elements 22 are preferably enclosed within a protective sheathing layer, preferably of the very same PVDF polymer material used as the piezoelectric material of the elements 22.

The cable 106 can be used in the form shown in FIG. 12, that is, in straight lengths of cable, to provide the various piezoelectric elements 22 used in the various disclosed embodiments. Known means, not shown, are provided for making both mechanical connections to the cables and electrical connections to the electrodes of the cables.

Figure 13:
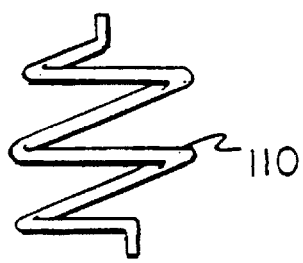
FIG. 13 shows a piezoelectric element in the form of a coil wound from the cable shown in FIG. 12.

As previously noted, the natural elasticity of the elements 22, in the various forms above described, can provide the necessary spring-like characteristics of the inventive systems. However, when additional resiliency is required (depending upon the parameters of the individual system), the piezoelectric elements 22 can comprise coiled springs 110 (FIG. 13) formed from the cable 106 shown in FIG. 12. For greater rigidity of the coiled springs 110, the axial wire 108 can be of a suitable material, e.g., spring steel, and have a diameter selected for the desired stiffness.

Figure 14:
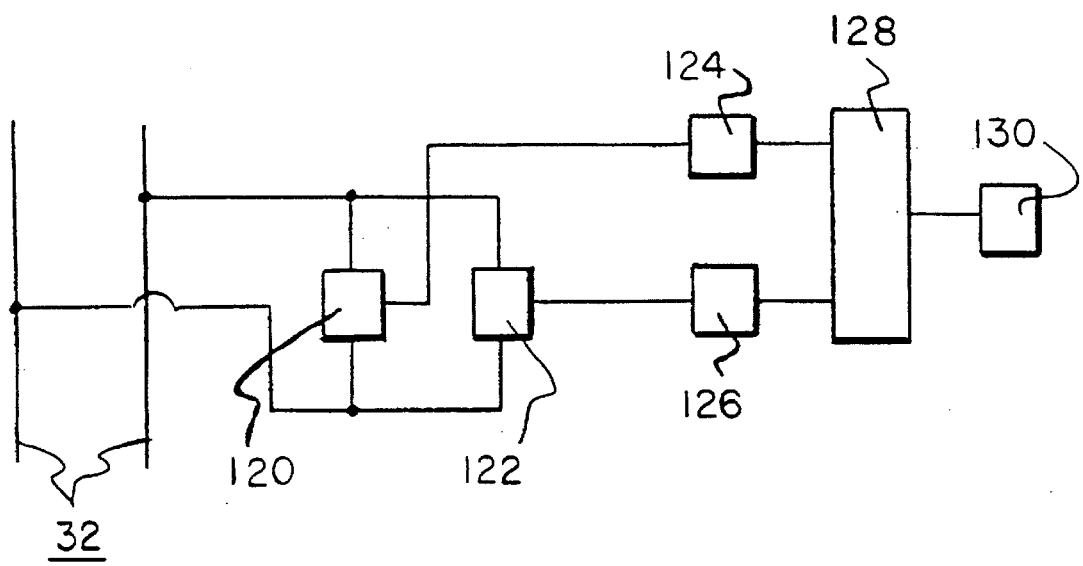
FIG. 14 is a block diagram of an arrangement for automatically tuning piezoelectric power generating systems.

FIG. 14 shows a block diagram of one means for tuning the various systems on an automatic continuous basis. A frequency analyzer 120 and a volt meter 122 continuously monitor, from a power cable 32, the electrical power being generated by the system being controlled. The measured frequency (corresponding to that of the surface waves) is stored and continuously updated in a storage and comparison means 124. Similarly, the output voltage is stored, updated and compared in a means 126. Differences between the stored and current frequency and between the stored and current generated voltage are fed to a computer 128. In response to changes in frequency in excess of some amount, e.g., 10%, the computer 128 directs a servo-motor means 130 to change a parameter of the system being controlled, e.g., the flooding of the weighted member 25 for changing its weight, in a direction for changing the natural frequency (the "tuning") of the piezoelectric system in direct proportion to the frequency change detected. The effect of such tuning change is monitored as a change in the monitored voltage, and the tuning is modified as necessary for maximizing the monitored voltage. Also, independently of monitoring the output frequency, tuning changes can be made in response to monitored voltage decreases or even on a random basis for making such changes as lead towards greater electrical energy production.

What is claimed is:

1. Apparatus for converting mechanical energy from surface waves on a body of water to electrical energy comprising a first member, a piezoelectric element supported from said first member, a second, weighted member supported from said piezoelectric element for applying a preselected straining of said piezoelectric element, said first member being a float having positive buoyancy for floating on the surface of said body of water and being movable in direct response to passing surface waves for inducing oscillation in said apparatus, said second member being suspended in said water and having a negative buoyancy, the apparatus being designed to resonate in response to passing waves at a first frequency, and including means for tuning the apparatus for changing the natural frequency of oscillation thereof in direct correspondence to changes in the frequency of said waves.

2. Apparatus according to claim 1 including means for monitoring the A.C. frequency of the electrical power generated by the apparatus, and said tuning means being responsive to said monitoring means.

3. Apparatus, for use with a structure mounted on the bottom of a body of water, for converting mechanical energy from the surface waves on the body of water to electrical energy comprising a first member, a piezoelectric element supported from said first member, a second, weighted member supported from said piezoelectric element for applying a preselected straining of said piezoelectric element, said first member being secured to said structure at a position above the water surface, said second member having a negative buoyancy but being supported for being at least partially submerged in said water for being movable in direct response to passing surface waves for inducing oscillations in the apparatus, said apparatus being designed to resonate in response to passing waves at a first frequency, and including means for tuning the apparatus for changing the natural frequency of oscillation thereof in direct correspondence to changes in the frequency of said waves.

4. Apparatus according to claim 3 including means for monitoring the A.C. frequency of the electrical power generated by the apparatus, and said tuning means being responsive to said monitoring means.

\* \* \* \* \*